March 15, 1927.

C. J. HOLSLAG 1,621,069

ELECTRIC ARC WELDING AND CUTTING SYSTEM

Original Filed Feb. 9, 1923

INVENTOR
CLAUDE J. HOLSLAG
BY
A. D. P. Libby
ATTORNEY

Patented Mar. 15, 1927.

1,621,069

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRIC-ARC WELDING AND CUTTING SYSTEM.

Original application filed February 9, 1923, Serial No. 617,919. Divided and this application filed October 8, 1924, Serial No. 742,497. Renewed September 18, 1926.

This invention relates to electric arc welding and cutting, and is a division of my prior application, Serial No. 617,919 filed February 9, 1923. In said previous application it has been pointed out that for certain classes of work there is a demand for a resistor-reactor welding system which generally consists of a suitable resistance, reactance, and the necessary apparatus to connect these together into a welding system.

My present invention is directed to a system for supplying this special demand.

In said previous application, I pointed out the advantages of a reactor having a core which is automatically moved to give the necessary results and it is one of the objects of my present invention to enlarge on this particular feature by pointing out and claiming more in detail the use of a relay-reactor, which performs a double function of a relay and a reactor, as the name implies.

Another object of my invention is to provide means for controlling a relatively high voltage of a direct current supply, so that the voltage normally across the arc electrodes, when they are not in use, is reduced to a safe value, whereby operators will not receive injurious shocks; and furthermore automatically control the current so the arc circuit is opened should the arc length be extended by the operator to a point where improper or poor welding is being done.

Where only one operator is used across the supply leads from a source of direct current of a voltage considerably above the welding voltage, the loss in regulating resistances becomes of great importance and it is, therefore, another object of my invention to provide a system in which these regulating losses are reduced to a minimum. This object is attained by an arrangement such that a plurality of arcs may be operated across the source of supply, thereby increasing the efficiency of the system in direct ratio to the number of operators served from a given voltage supply. In attaining the above stated object, I control the arc voltage so that no long arc can be held with disastrous results.

Other objects will be apparent to one skilled in this art after a study of the specification and drawing, wherein.

Figure 1:
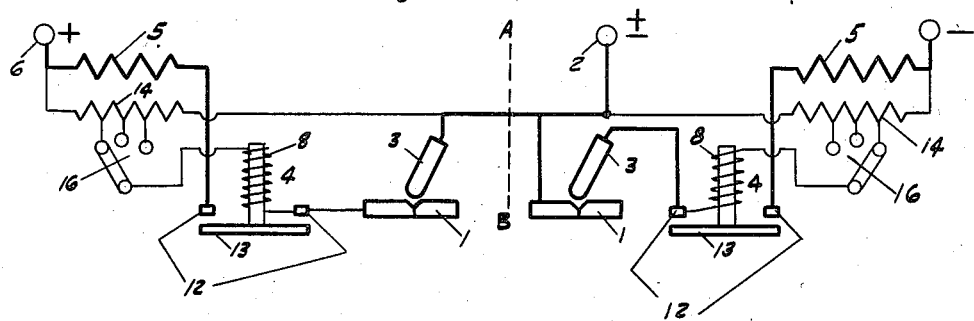
Figure 1 is a schematic arrangement showing two operators connected across a three-wire source of supply.
Figure 2:
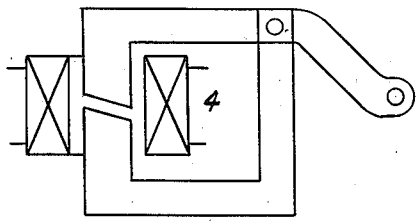
Figure 2 is a diagrammatic view of the reactor-relay shown in Fig. 1, but with all the levers, springs and contacts, etc., removed for the sake of clarity.

In the drawing I have shown two welding sets connected across the outside of a three-wire system, the neutral being connected to the junction of the two sets so that either set to the right or left of the dotted line A/B may be operated across one side of the three-wire system. The arrangement is very similar to that described in said previous application, except the relay 4 is simplified by having only one winding 8 connected to the adjusting device 16 and one of the arc electrodes. In this arrangement the contacts 12 are joined together by the member 13 by the actuation of the relay 4 on bringing the electrodes 1 and 3 together. The relay 4 of itself is adapted to have an adjustment, which adjustment features, however, for the sake of clarity, are not shown in the drawing. The potentiometer 14 is of relatively high resistance and is provided with taps so that the proper voltage may be applied to the winding 8 in accordance with the source of supply. The relay 4 performs similar services as the relay 4 in said previous application except that in this case as the voltage across the arc raises to a point where the difference between it and the potentiometer voltage is less than the power holding voltage of the relay, then the relay opens.

It will be readily appreciated that since the arrangements shown in the drawing are schematic that the principles of my welding systems may be carried out by the use of numerous designs, so far as the particular pieces of apparatus are concerned and I, therefore, do not wish to be limited to any particular design of a relay, or compensating or stabilizing resistance as these designs may be varied through a wide range.

It may be pointed out that the winding 8 of the relay 4 in Fig. 1 acts as an aid in absorbing the inductive kick when the arc is broken.

Having thus described my invention, what I claim is:

1. In an arc welding and cutting system, a main source of current for the arc, a steadying resistance in the arc circuit, a potentiometer resistance connected to said source of supply and a relay for closing the arc circuit having a single winding continuously connected in the same relationship across one arc electrode and the potentiometer resistance intermediate its ends.

2. In an arc welding and cutting system, a main source of current for the arc, a steadying resistance in the arc circuit, a potentiometer resistance connected to said source of supply and a relay for closing the arc circuit, said relay having a winding connected into the potentiometer resistance for holding the arc circuit closed until the voltage across the arc increases to a predetermined value whereby the voltage across said relay winding falls below its "holding-in" value and the relay opens.

3. In an arc welding and cutting system, a main source of current for the arc, a steadying resistance in the arc circuit, a potentiometer resistance connected to said source of supply and a relay for closing the arc circuit, said relay having a winding connected into the potentiometer resistance for holding the arc circuit closed until the difference between the potentiomter voltage applied to the winding and the arc voltage is less than the holding power volts of said winding.

4. In an arc welding and cutting system, a main source of current for the arc, a steadying resistance in the arc circuit, a potentiometer resistance connected to said source of supply and a relay for closing the arc circuit, said relay having a winding connected into the potentiometer resistance for holding the arc circuit closed until the difference between the potentiometer voltage applied to the winding and the arc voltage is less than the holding power volts of said winding, and means for varying the opening point of the relay.

5. In an arc welding and cutting system, a source of D. C. current of relatively high voltage, means for reducing the voltage across the arc electrodes to a normal safe value consisting of a potentiometer of relatively high resistance connected to said source of current, and a relay having a single winding connecting into said resistance intermediate its ends and to one of said electrodes, said winding adapted to close the arc circuit when the electrodes are touched, and to open the arc circuit when the voltage across the arc is raised to a predetermined value.

6. In an arc welding and cutting system, a source of D. C. current of relatively high voltage, means for limiting and controlling this voltage to a welding voltage, consisting of; a potentiometer connected to said source of current, a steadying resistance in the arc circuit, and a relay with a single winding thereon connected between the potentiometer and one electrode and adapted to close the arc circuit at the relay when the electrodes are brought together and to open the arc circuit when the voltage across the arc is raised to a predetermined value.

7. In an arc welding and cutting system, a source of D. C. current of relatively high voltage, means for limiting and controlling this voltage to a welding voltage, consisting of; a potentiometer connected to said source of current, a steadying resistance in the arc circuit, and a relay with a single winding thereon connected between the potentiometer and one electrode and adapted to close the arc circuit at the relay when the electrodes are brought together and to open the arc circuit when the voltage across the arc is raised to a predetermined value, and means independent of the arc for varying the closing and opening of the relay.

8. In an arc welding and cutting system, a source of D. C. current of relatively high voltage, means for reducing the voltage across the arc electrodes to a normal safe value consisting of a potentiometer resistance connected to said source of current, and a relay having a single winding connecting into said resistance intermediate its ends and to one of said electrodes, said winding adapted to close the arc circuit when the electrodes are touched, and to open the arc circuit when the voltage across the arc is raised to a predetermined value, said relay winding further serving to aid in absorbing the kick voltage produced when the arc is broken.

In testimony whereof, I affix my signature.

CLAUDE J. HOLSLAG.